July 1, 1924.
1,499,718
J. ZYKIN
DISHWASHING MACHINE
Filed Dec. 6, 1922
2 Sheets-Sheet 1
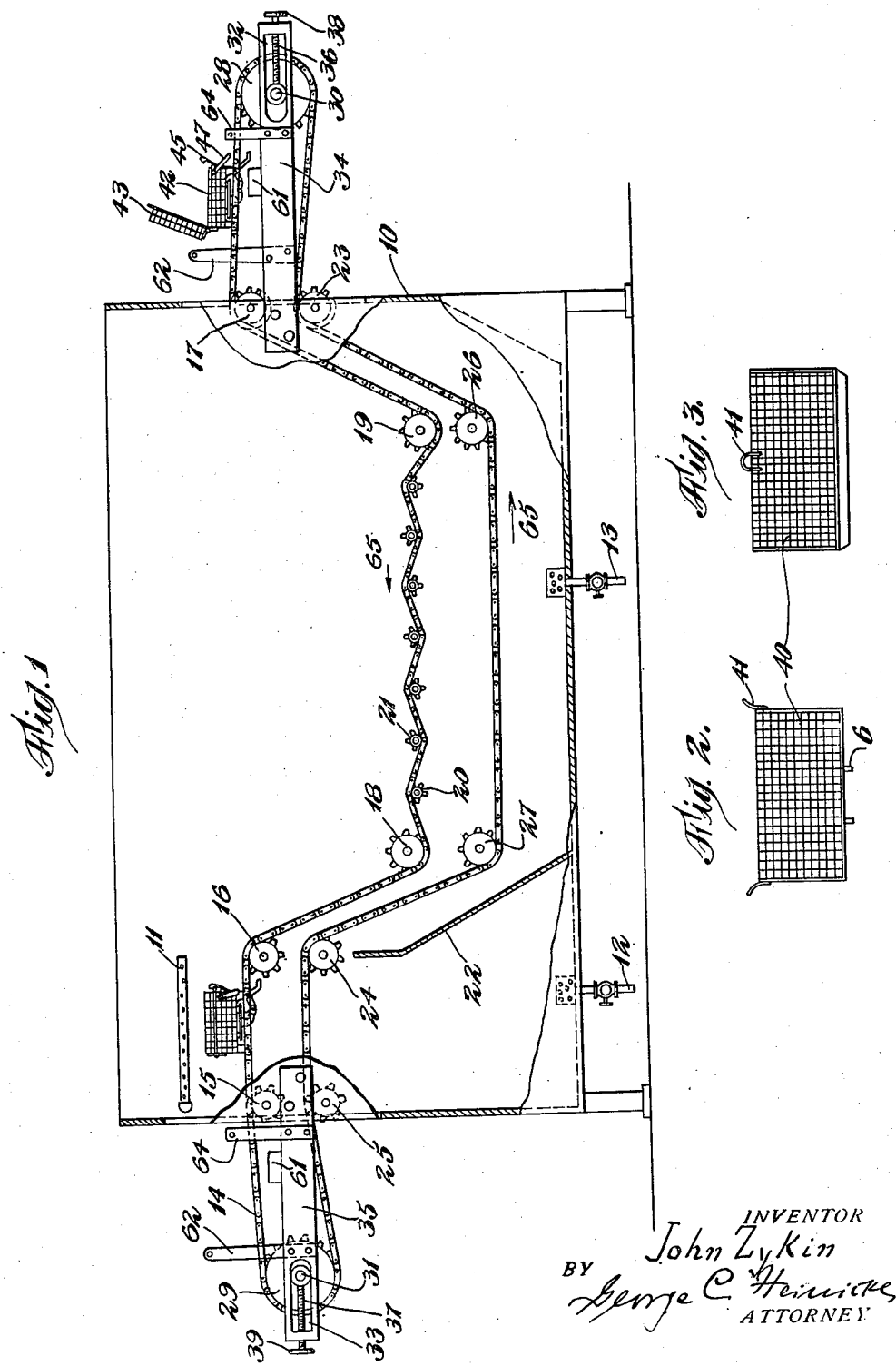
INVENTOR
John Zykin
BY George C. Heinricks
ATTORNEY

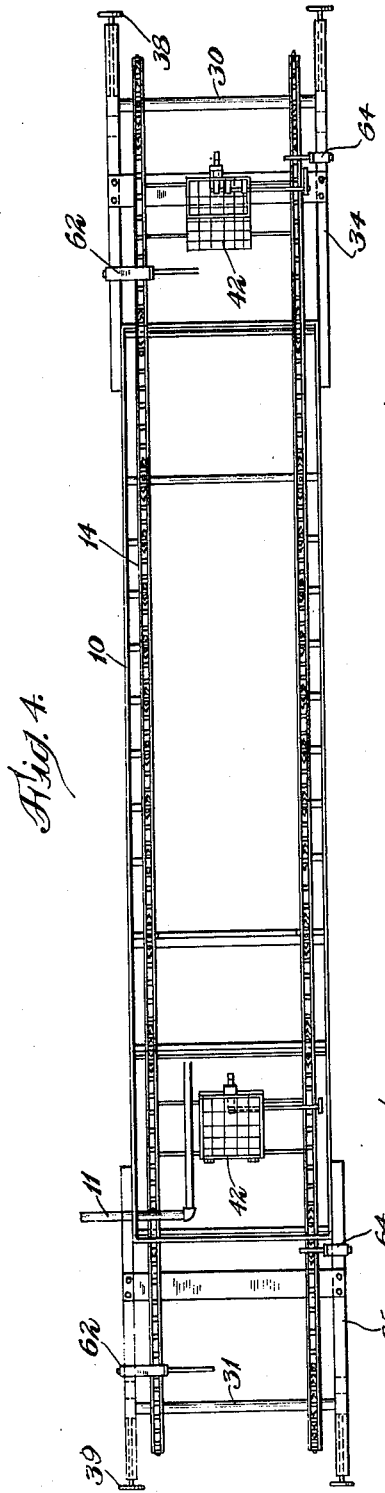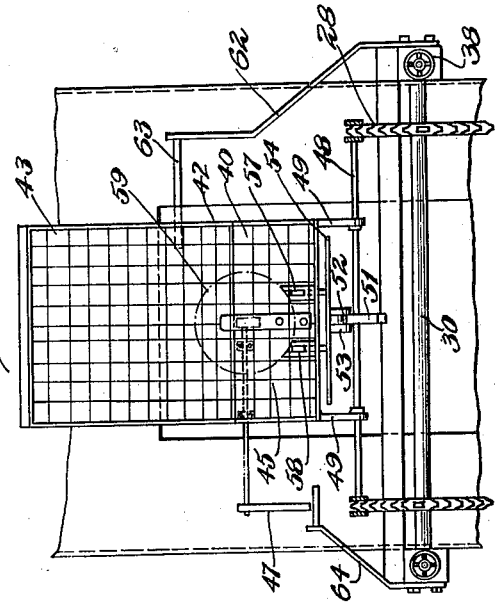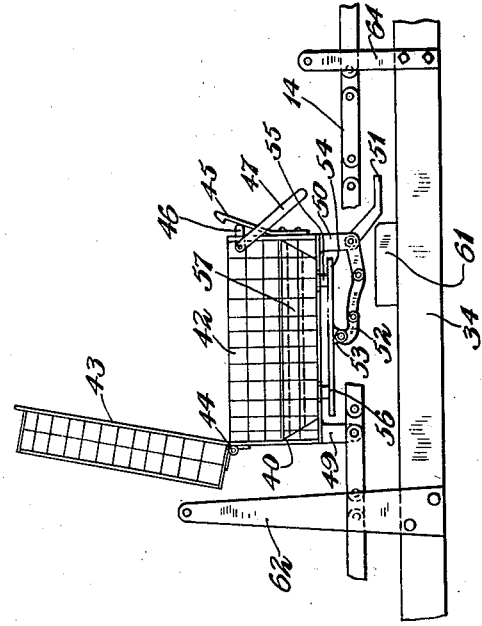

Patented July 1, 1924.

1,499,718

UNITED STATES PATENT OFFICE.

JOHN ZYKIN, OF NEW YORK, N. Y.

DISHWASHING MACHINE.

Application filed December 6, 1922. Serial No. 605,214.

*To all whom it may concern:*

Be it known that I, JOHN ZYKIN, a citizen of Russia, residing at New York, county of New York, and State of New York, have invented certain new and useful Improvements in Dishwashing Machines, of which the following is a specification.

This invention relates to improvements in machines for washing and cleaning culinary utensils, particularly plates, dishes, saucers and the like, and it is the principal object of the invention to provide a machine of this character in which the articles to be washed are placed into baskets and submitted to the action of steam or hot water.

Another object of the invention is to provide a machine in which a wave like or rocking motion is imparted to the baskets containing the articles to be washed during their travel through the washing vat.

A further object of the invention is the provision of a dish washing machine comprising means for automatically opening the baskets after the washing operation is finished and for regulating the tension of the conveyor belt.

A still further object of the invention is the provision of a dish washing machine having means for lifting the washed dishes within the baskets for allowing a convenient removal of the same.

Other objects and advantages of my invention will become apparent as the description thereof proceeds, and will then be more specifically pointed out in the appended claims.

In the accompanying drawings, forming a material part of this disclosure:

Figure 1 is a side elevation, partly in section of a dish washing machine constructed according to the present invention.

Figure 2 is a side view of a basket for receiving silverware to be washed.

Figure 3 is an end view thereof.

Figure 4 is a top plan view of my novel machine.

Figure 5 is a detail side elevation of a dish basket and co-operating parts on an enlarged scale.

Figure 6 is an end view thereof.

Through a vat 10 provided with a steam or hot water supply nozzle or pipe 11, and drain cocks 12 and 13, an endless conveyer 14 is guided over upper pairs of sprocket wheels 15, 16, 17, the stub shafts for which are secured in the side walls of the tank, and lower pairs of sprocket wheels 18 and 19. Between wheels 18 and 19, the conveyer 14 is guided over alternating lower pairs of sprockets 20 and upper pairs of sprockets 21 in order to impart to the conveyer a wave like motion.

A splash wall or partition 22 is provided near one end of the vat separating the dirty water from a supply of clean water. During its return movement the conveyer is guided over upper pairs of sprocket wheels 23, 24, 25, and lower pairs of sprocket wheels 26 and 27.

At the ends of the vat 10, the conveyer belt 14 is guided over pairs of sprocket wheels 28 and 29, the shafts 30 and 31 of which are journalled in longitudinal openings 32 and 33 of frames 34 and 35, and screws 36 and 37, engage shafts 30 and 31 and are extended through the front part of the frames where they carry the hand wheels 38 and 39 by means of which the tension of the conveyer chain may be regulated in an obvious, well known manner.

The articles to be cleaned are placed into the small baskets 40, illustrated in Figures 2 and 3, provided with handles 41 by means of which these baskets may be conveniently lifted out of the larger baskets 42 provided with covers 43 connected to the baskets by means of spring hinges 44.

These covers are held in closed position by means of snaphooks 45 which are adapted to be released by means of a link 46 operated by a lever 47.

The baskets 42 are secured to cross bars 48 of the conveyer by means of links 49 and 50, and between links 50, a lever 51 is attached at the end of a chain 52, the other end of which is secured to a bracket 53 on the movable plate 54 which carries posts 55 and 56, the upper ends of which are adapted to engage cross bars 57 and 58 to lift the small baskets 40 carrying the articles to be cleaned, indicated at 59 within baskets 40 which are provided with bottom pins 6, when lever 51 engages a block 61 on frames 34 and 35.

Large stop pins 62 are secured to frames 34 and 35 and are adapted to be engaged by pins 63 on the baskets 42 for closing the covers 43 as will be hereafter more fully described. Smaller operating levers 64 are also secured to the frames 34 and 35 and are adapted to engage levers 47 for releasing the catches 45.

The device operates as follows:

If the motor is started or shafts 30 or 31 are rotated by means of cranks, not shown, as they do not form part of this invention, the conveyer will be moved in the direction of arrows 65, and the levers 47 of baskets 42 secured thereto will successively engage levers 64 and guide them into the position illustrated in Figure 5 to release the catches 45 and the lids or covers will spring open, while at the same time lever 51 will engage block 61 and raise the small baskets with the washed dishes so that they can now be easily removed and replaced by others.

A continued movement of the conveyer will bring pins 63 into contact with stop pins 62 which will close the cover of the basket. The same is now carried through the vat and submitted to the wave like motions, whereafter pins 47 again strike against levers 64 allowing the lid to spring open and an exchange of dishes whereupon the lid is closed again by striking with its pins 63 against pin 62, and the baskets and dishes are submerged again.

If it is desired to submit the dishes to a repeated cleansing operation, the same are left in the baskets and the conveyer is rotated two or three times or oftener in order to let all dishes participate in the wave like motions. The exhaust cocks should preferably remain open during the operation so that always a fresh supply of the cleaning medium is present in the vat.

Changes may be made in the general arrangement and in the construction of the minor details of my device without deviating from the scope and spirit thereof.

What I claim as new and desire to secure by Letters Patent is:

1. A dish washing machine comprising an endless conveyer, means for guiding said conveyer through a vat filled with a cleaning medium, means for imparting to said conveyer a wave like motion while it is guided through the vat, outer baskets on said conveyer, inner baskets in said outer baskets for the reception of the articles to be washed, means for automatically opening said outer baskets to allow an exchange of the articles therein, means for closing said outer baskets, means for raising said inner baskets in said outer baskets, and means for regulating the tension of said conveyer.

2. A dish washing machine comprising a vat, an endless conveyer adapted to be guided through said vat, means for regulating the tension of said conveyer, alternating high and low ratchet wheels for imparting to said conveyer a wave like motion, a splash shield in said vat, a plurality of outer baskets secured to said conveyer and adapted to be carried through said vat, inner baskets within said outer baskets, means for holding said inner baskets within said outer baskets, means for raising said inner baskets, a cleansing fluid supply pipe for said vat and exhaust cocks at the bottom of said vat.

3. In a dish washing machine, a vat, a conveyer, frames at the opposite ends of said vat, upstanding fingers and levers on said frame, blocks on said frame, outer baskets attached to said conveyer adapted to removably receive inner baskets receiving the articles to be cleaned, movable plates beneath the outer baskets provided with upstanding pins on which the inner baskets are supported, a link on said plates and a lever secured to said link adapted to be engaged by said block to lift the inner baskets, means on said outer baskets adapted to be engaged by said frame levers to allow the spring lid of the outer baskets to open, and means on said outer baskets adapted to be engaged by said frame fingers for closing the baskets before their submersion, means for supplying a liquid cleansing medium to said vat, means to exhaust the dirty wash water, means to regulate the tension of said conveyer, and means for imparting to the articles to be washed a wave like motion through the cleaning medium.

In testimony whereof I have affixed my signature.

JOHN ZYKIN.